United States Patent [19]

Novak

[11] 4,356,037
[45] Oct. 26, 1982

[54] ABRASION RESISTANT COATING

[76] Inventor: Robert L. Novak, 7 Oxbow Rd., Medfield, Mass. 02052

[21] Appl. No.: 149,138

[22] Filed: May 12, 1980

[51] Int. Cl.³ .......................... C08L 5/00; B32B 5/16
[52] U.S. Cl. ........................ 106/209; 106/281 R; 523/220; 427/201; 428/325; 428/328; 428/327; 428/406; 404/19; 404/20; 404/21
[58] Field of Search ..................... 106/36, 209, 281 R; 260/998.13, 37 R, 40 R, 37 EP, 42 T, 37 N, 37 SI; 427/201; 428/325, 328, 323, 327, 402, 406, 212, 142; 404/19, 20, 21

[56] References Cited

U.S. PATENT DOCUMENTS

| | | |
|---|---|---|
| 3,091,548 | 5/1963 | Dillon . |
| 3,097,959 | 7/1963 | Zachman . |
| 3,117,845 | 1/1964 | Reed . |
| 3,753,758 | 8/1973 | Shanley . |
| 3,797,951 | 3/1974 | Zichner ................................ 404/19 |
| 3,876,579 | 4/1975 | Hallstrom et al. ............. 260/37 EP |
| 3,878,147 | 4/1975 | Craven ........................... 260/998.13 |
| 3,900,602 | 8/1975 | Rummel .............................. 427/201 |
| 3,989,861 | 11/1976 | Rasmussen ......................... 427/180 |
| 4,075,376 | 2/1978 | Jaeger ................................ 428/36 |
| 4,111,891 | 9/1978 | Reynolds ............................ 106/36 |
| 4,129,548 | 12/1978 | McDonnell ..................... 260/37 M |
| 4,162,900 | 7/1979 | Judd ................................. 428/329 |
| 4,187,608 | 2/1980 | Nyce .................................. 433/201 |

Primary Examiner—Marion McCamish
Assistant Examiner—E. Rollins Buffalow
Attorney, Agent, or Firm—Scott R. Foster

[57] ABSTRACT

An abrasion resistant coating comprising a binder having dispersed therein first abrasion-resistant particles of substantially uniform size and second abrasion-resistant particles of substantially uniform size, the second particles having diameters of less than 15.4% of the first particles, the combined volume of the second particles and binder being at least about equal to the void volume of the first particles, the volume of the binder being at least equal to the combined void volumes of the first and second particles when they are interdispersed with one another.

3 Claims, 1 Drawing Figure

ABRASION RESISTANT COATING

BACKGROUND OF THE INVENTION

1. Field of the Invention

This invention relates to abrasion resistant coatings and is directed more particularly to a coating resistant to fluids carrying particulate matter.

2. Description of the Prior Art

There are two established methods to resist particulate abrasion: (1) the provision of a hard wear-resistant surface, or (2) the provision of an elastic surface which yields and rebounds after impact. The hard surface approach generally involves the binding of hard particles, as by an adhesive, to the surface to be protected. It has been found that to be effective the wear-resistant particles must be similar in size to the impinging particles. Small particles resist other small particles, but larger particles tend to gouge and plow the small particles from the protective surface. On the other hand, large particles usually do not resist fine particulate abrasion which wears away the polymeric adhesive between the large particles, allowing the particles to be dislodged from the protective surface.

It would be beneficial to have available a protective coating which resists wear when subjected to a variety of particle sizes.

SUMMARY OF THE INVENTION

It is, therefore, an object of the invention to provide an abrasion resistant coating having facility for withstanding abrasive exposure to particulate of various sizes.

With the above and other objects in view, as will hereinafter appear, a feature of the present invention is the provision of an abrasion resistant coating comprising a binder having dispersed therein first abrasion-resistant particles of substantially uniform size, and second abrasion-resistant particles of substantially uniform size, the second particles having diameters of less than 15.4% of the first particles, the combined volume of the second particles and binder being at least about equal to the void volume of the first particles, the volume of the binder being at least equal to the combined void volumes of the first and second particles when they are interdispersed with one another.

The above and other features of the invention, including various novel details of construction and combinations of parts, will now be more particularly described with reference to the accompanying drawings and pointed out in the claims. It will be understood that the particular coating embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings:

Figure 1:
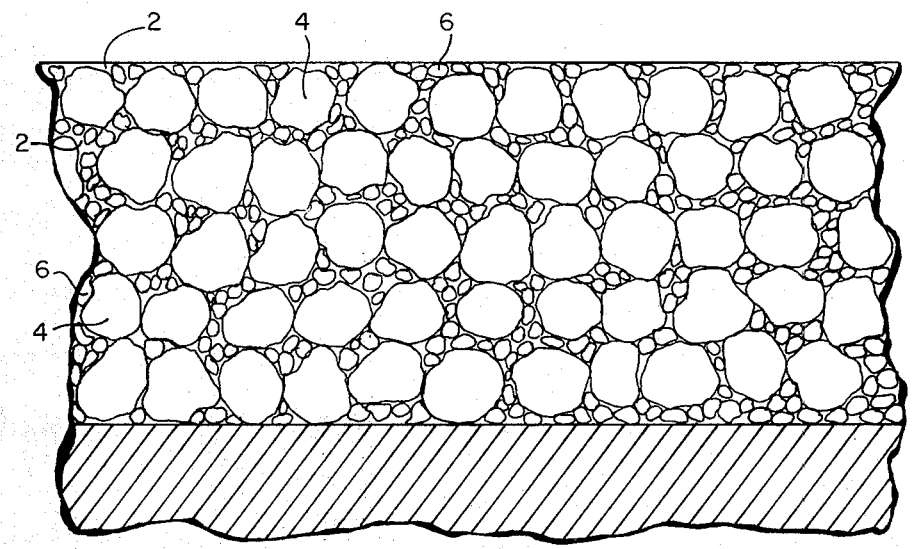

The FIGURE is an enlarged diagrammatic showing, not to scale, of a coating illustrative of an embodiment of the invention.

DESCRIPTION OF THE PREFERRED EMBODIMENTS

The coating includes a binder 2 which may be selected from a wide range of available liquid polymerizable resins, thermoplastic or thermosetting. In some applications, a resilient binder, such as rubber, vinyl and urethanes, may be used to provide shock absorbing qualities. Binders found to be appropriate include: epoxies, polyesters, vinylesters, polyurethanes, alkyds, vinyls, polystyrenes, acrylics, silicones, phenolics, rubbers, bitumens, pitches, gums, polyimides and polymercaptons.

The coating further includes first abrasion-resistant particles 4 dispersed in the binder, the particles being of substantially uniform size. Any hard granular material will serve the purpose, depending upon the service and degree of abrasion resistance required. Of critical importance is the sizing. Accordingly, as a matter of convenience, the use of abrasive grains in sieve sizes facilitates easy access to usable materials. Materials found to be appropriate include alundum, alumina, silicon carbide, boron carbide, zirconia and others in sizes varying from Grit 8 (0.1817) inch diameter) to 1000 (0.00020 inch diameter). Preferably, the particles are of a generally spherical configuration.

Further included in the coating are second abrasion-resistant particles 6 disposed in the binder, the second particles being of substantially uniform size and having diameters of less than 15.4% of the diameters of the first particles. The second particles are preferably, but not necessarily, of the same material as the first particles. As in the case of the first particles, the use of sieved sizes of particles, readily available on the market, is convenient. While there is invariably a range of tolerance relative to the sizes of the first and second particles, the first particles, as noted above, are of substantially the same size and the second particles are of substantially the same size. Accepting the deviations of tolerance, the second particles have in general a diameter size less than 15.4% the general diameter size of the first particles. Thus, if the first particle is selected of a size of Grit 8 (0.1817 inch diameter), the second particle must not be greater than Grit 46 (0.0200 inch diameter). Similarly, if Grit 46 is selected as the first particle component, than the second particles must not be greater than Grit 180 (0.003 inch diameter). The second particles are interspersed around and between the first particles, fitting between the close-packed first particles.

In mixing the coating, the relative volumes of the particles and binder are critical. The combined volumes of the second particles and binder should be at least about equal to the void volume of the first particles. The "void volume" is intended to mean the volume of the air space, or unoccupied space, present in a given volume of first particles. In addition, the volume of the binder is at least equal to the combined void volumes of the first and second particles when they are interdispersed with one another. The combined void volumes of the first and second particles refers to the unoccupied space present in a given volume of first and second particles randomly mixed together.

A specific example of a suitable composition for use in the coating is:

Binder: Ciba Geigy 6005 Epoxy and
Ciba Geigy 840 Hardner

-continued

| | |
|---|---|
| Amount: 30 ml | |
| First Particle: Silicon Carbide of Grit size 100 | |
| (.0068 inch diameter) | |
| Amount: 100 ml | |
| Second Particle: Aluminum Oxide of Grit size 400 | |
| (.00090 inch diameter) | |
| Amount: 48 ml | |
| Diameter size of second particle is 13.2% of diameter size of first particle. | |
| Combined Volume of second particles and binder | = 48 ml |
| Void Volume of first particles | = 48 ml |
| Volume of binder | = 30 ml |
| Combined void volume of first and second particles | = 25 ml |
| Another example of a suitable composition is as follows: | |
| Binder: Ciba Geigy 6005 Epoxy and TETA Hardner | Amt: 32 ml |
| First Particle: Silicon Carbide of Grit size 100 (.0068 inch diameter) | Amt: 100 ml |
| Second Particle: Silicon Carbide of Grit size 600 (.00048 inch diameter). | Amount: 50 ml |
| Diameter size of second particle is 7.0% of diameter size of first particle: | |
| Combined Volume of second particles and binder | = 50 ml |
| Void volume of first particles | = 48 ml |
| Volume of binder | = 32 ml |
| Combined void volume of first and second particles | = 22 ml |

While the use of two sizes of particles in the coating is believed to be sufficient for most purposes, it will be evident that the concept may readily be extended to include particles of three or more sizes. An example of a suitable three-particle composition is as follows:

| | |
|---|---|
| Binder: Ciba Geigy 6005 Epoxy and TETA Hardner | |
| Amount: 20 ml | |
| First Particle: Silicon Carbide of Grit size 100 (.0068 in diameter). | |
| Second Particle: Silicon Carbide of Grit size 400 (.00090 in diameter). | |
| Third Particle: Silicon Carbide of Grit size 1000 (.00020 in diameter). | |
| Particle Amounts: 100 ml, 48 ml, 24 ml, respectively. | |
| Diameter of second particle is 13.2% of diameter of first particle. | |
| Diameter of third particle is 2.9% of diameter of first particle. | |
| Combined volume of third particles and binder | = 25 ml |
| Void volume of first and second particles combined | = 25 ml |
| Void volume of all particles combined | = 15 ml |
| Volume of binder | = 20 ml |
| Void volume of first particles | = 48 ml |
| Combined volume of second and third particles | = 48 ml |

In the case of the three particle composition, the third particles should be of such size as to fit in the voids between the first and second size particles, and should have diameters of less than 6.3% of the first particles, the combined volume of the second and third particles and binder being at least about equal to the void volume of the first particles, the volume of the binder being at least equal to the combined void volumes of all the particles when they are interdispersed with one another.

The composition above described provide effective abrasion-resistant coatings which will withstand abrasion of a large range of particulate sizes.

The uses for the abrasion-resistant coating are numerous and varied. The coating finds application wherever surfaces are subjected to rapidly moving liquids or gases having particles therein. The coating resists the impingement of the particles entrained in the flowing material and resists the erosion ordinarily caused by such particles. A few of the areas in which the coating is useful include surfaces of pumps, valves, turbines, heat exchangers, scrubbers, piping and fittings, mixers, troughs, ducts and dampers, and tanks and other vessels.

It is to be understood that the present invention is by no means limited to the particular construction herein disclosed and/or shown in the drawings, but also comprises any modifications or equivalents within the scope of the disclosure.

Having thus described my invention what I claim as new and desire to secure by Letters Patent of the United States is:

1. An abrasion resistant coating comprising a binder having dispersed therein first abrasion-resistant generally spherical particles of substantially uniform size, said first particle size being no larger than Grit size 8 and no smaller than Grit size 1000, and second abrasion-resistant generally spherical particles of substantially uniform size, the second particles having diameters of less than 15.4% of the diameters of said first particles, the combined volume of said second particles and said binder being at least equal to the void volume of said first particles, the volume of said binder being at least equal to the combined void volume of said first and second particles when said first and second particles are interdispersed with one another.

2. The invention according to claim 1 in which said first and second particles are of the same material.

3. The invention according to claim 1 in which said second abrasion-resistant particles include two groups of particles, a first of said groups comprising particles of substantially uniform size having diameters of about 15% of the diameters of said first particles, and a second of said groups comprising particles of substantially uniform size having diameters of less than 6.3% of the diameters of said first particles.

* * * * *